(12) United States Patent
Grant et al.

(10) Patent No.: US 10,603,717 B2
(45) Date of Patent: Mar. 31, 2020

(54) SYSTEM AND METHOD FOR MANUFACTURING A COMPONENT

(71) Applicant: Caterpillar Inc., Peoria, IL (US)

(72) Inventors: Marion B. Grant, Princeville, IL (US); Nathan John Parsons, Metamora, IL (US); Thierry Andre Marchione, Heber, UT (US); Huijun Wang, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 818 days.

(21) Appl. No.: 15/244,136

(22) Filed: Aug. 23, 2016

(65) Prior Publication Data

US 2018/0056389 A1    Mar. 1, 2018

(51) Int. Cl.
| | | |
|---|---|---|
| *B29C 64/245* | (2017.01) | |
| *B22F 3/105* | (2006.01) | |
| *B33Y 10/00* | (2015.01) | |
| *B33Y 30/00* | (2015.01) | |
| *B33Y 40/00* | (2020.01) | |
| *B22F 3/24* | (2006.01) | |
| *B29C 64/188* | (2017.01) | |

(52) U.S. Cl.
CPC ............. *B22F 3/1055* (2013.01); *B22F 3/24* (2013.01); *B29C 64/188* (2017.08); *B29C 64/245* (2017.08); *B33Y 10/00* (2014.12); *B33Y 30/00* (2014.12); *B33Y 40/00* (2014.12); *Y02P 10/295* (2015.11)

(58) Field of Classification Search
CPC .................................................. B29C 64/245
See application file for complete search history.

(56) References Cited

U.S. PATENT DOCUMENTS

| | | |
|---|---|---|
| 3,576,540 A | 4/1971 | Fair et al. |
| 8,383,985 B2 | 2/2013 | Twelves, Jr. et al. |
| 2002/0147521 A1* | 10/2002 | Mok ..................... B29C 64/106 700/159 |
| 2004/0107019 A1 | 6/2004 | Keshavmurthy et al. |
| 2005/0274661 A1 | 12/2005 | Jackson |
| 2007/0205184 A1 | 9/2007 | Mazumder et al. |
| 2015/0210007 A1* | 7/2015 | Durand ................. B29C 64/106 264/401 |

* cited by examiner

Primary Examiner — Timothy Kennedy
(74) Attorney, Agent, or Firm — Harrity & Harrity LLP

(57) ABSTRACT

A system for manufacturing a Three Dimensional (3D) printed component is provided. The system includes a substrate adapted for at least partially 3D printing the component thereon. The substrate includes a first geometrical feature. The system also includes a plurality of processing stations interconnected to one another. Each of the plurality of processing stations is adapted to receive the substrate. Each of the plurality of processing stations includes a second geometrical feature adapted to interlock with the first geometrical feature.

20 Claims, 3 Drawing Sheets

SYSTEM AND METHOD FOR MANUFACTURING A COMPONENT

TECHNICAL FIELD

The present disclosure relates to a system and a method for manufacturing a component. More particularly, the present disclosure relates to the system and the method for manufacturing the component using Three Dimensional (3D) printing.

BACKGROUND

Generally for manufacturing a component using an additive manufacturing process such as Three Dimensional (3D) printing, a substrate is used as a base for manufacturing the component thereon. Typically, the 3D printed component once manufactured may require further processing such as polishing, grinding, heat treatment, metrology, and so on, in order to finish the manufactured component.

During such additive manufacturing process, the component may be 3D printed on the substrate at one work table. Further, the substrate along with the manufactured component thereon may be transferred to one or more different work tables for additional processing of the manufactured component. This transfer of substrate/component requires additional fixturing tools at the different work tables where the manufactured component may be processed.

Furthermore, the fixturing tools may have to be designed specifically to conform to the unique geometry of the manufactured component. As a result, different fixturing tools may be required for every different component to be manufactured. This in turn may add to the tooling cost, manufacturing cost, and so on related to every different component to be manufactured using additive manufacturing process.

U.S. Pat. No. 8,383,985 describes a method for operating an integrated additive machining cell system. The system includes supplying power and communications from an enclosed central manufacturing cell to a plurality of external modules. The system includes manufacturing a part via an additive manufacturing process. The system also includes performing secondary operations with one or more external modules on the part while the part is in the enclosed central manufacturing cell. The system further includes performing secondary operations on the part in one or more additional external modules.

SUMMARY OF THE DISCLOSURE

In an aspect of the present disclosure, a system for manufacturing a Three Dimensional (3D) printed component is provided. The system includes a substrate adapted for at least partially 3D printing the component thereon. The substrate includes a first geometrical feature. The system also includes a plurality of processing stations interconnected to one another. Each of the plurality of processing stations is adapted to receive the substrate. Each of the plurality of processing stations includes a second geometrical feature adapted to interlock with the first geometrical feature.

In another aspect of the present disclosure, a system for manufacturing a Three Dimensional (3D) printed component is provided. The system includes a substrate having a first surface and a second surface disposed opposing and spaced apart from the first surface. The first surface is adapted for at least partially 3D printing the component thereon. The second surface includes a first protrusion. The system also includes a plurality of processing stations interconnected to one another. Each of the plurality of processing stations is adapted to receive the substrate. Each of the plurality of processing stations includes a first slot adapted to interlock with the first protrusion.

In yet another aspect of the present disclosure, a method for manufacturing a Three Dimensional (3D) printed component is provided. The method includes providing a substrate having a first geometrical feature. The method includes providing a first processing station having a second geometrical feature. The method includes interlocking the first geometrical feature with the second geometrical feature. The method includes at least partially manufacturing the component on the substrate by 3D printing. The method includes disconnecting the substrate from the first processing station. The method includes transferring the substrate to a second processing station having a second geometrical feature. The method also includes interlocking the first geometrical feature of the substrate with the second geometrical feature of the second processing station. The method further includes processing the at least partially 3D printed component on the second processing station.

Other features and aspects of this disclosure will be apparent from the following description and the accompanying drawings.

DETAILED DESCRIPTION

Figure 1:
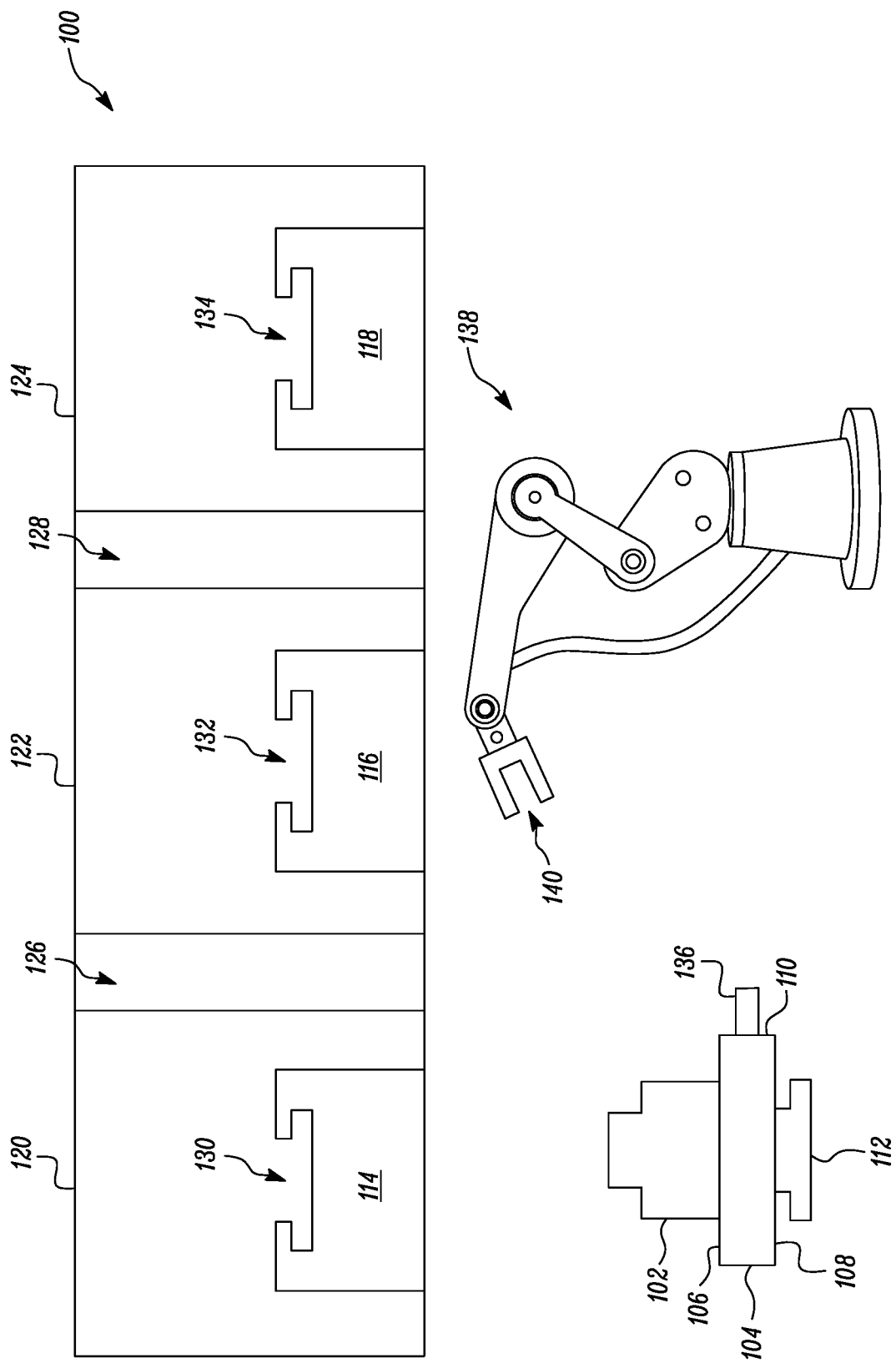
FIG. 1 is a schematic representation of a system for manufacturing a component, according to one embodiment of the present disclosure.

Wherever possible, the same reference numbers will be used throughout the drawings to refer to the same or the like parts. Referring to FIG. 1, an exemplary system 100 for manufacturing an exemplary component 102 is illustrated. In the illustrated embodiment, the component 102 has a stepped configuration. In other embodiments, the component 102 may have any other configuration and/or geometry based on application requirements without limiting the scope of the disclosure. The component 102 may be any component made of a metal or a polymer.

The system 100 includes a substrate 104. In the illustrated embodiment, the substrate 104 has a plate like configuration. In other embodiments, the substrate 104 may have a post like configuration. The substrate 104 provides a base in order to manufacture the component 102 thereon using additive manufacturing. More specifically, the component 102 is manufactured using any known Three Dimensional (3D) printing process such as Direct Metal Laser Deposition (DMLD), Metal Powder Bed Laser Sintering (MPBLS), and so on. In some embodiments, the substrate 104 may be adapted to manufacture multiple components (not shown) simultaneously using 3D printing.

The substrate 104 includes a first surface 106. The first surface 106 is adapted to manufacture the component 102 thereon. The substrate 104 includes a second surface 108 disposed opposing and spaced apart from the first surface 106. Also, the substrate 104 includes a third surface 110 provided in association with the first surface 106 and the second surface 108. More specifically, the third surface 110 extends between the first surface 106 and the second surface 108.

The substrate 104 further includes a first geometrical feature. In the illustrated embodiment, the first geometrical feature is a first protrusion 112 extending from the second surface 108. More specifically, the first protrusion 112 includes an inverted T-shaped configuration. In other embodiments, the first protrusion 112 may include any other configuration such as an L-shaped configuration, a stepped configuration, a toothed configuration, and so on.

Further, the system 100 includes a number of processing stations. More specifically, in the illustrated embodiment, the system 100 includes a first processing station 114, a second processing station 116, and a third processing station 118. In other embodiments, the system 100 may include a single or multiple processing stations based on application requirements.

In the illustrated embodiment, the first processing station 114 is adapted for receiving the substrate 104 for 3D printing the component 102 on the substrate 104. It should be noted that the component 102 or multiple components (not shown) may be 3D printed partially or completely at the first processing station 114 and will be explained in more detail later. The first processing station 114 includes a first enclosure 120 associated therewith. The first enclosure 120 is adapted to enclose the first processing station 114 therein. Also, the first enclosure 120 may enclose one or more equipment associated with the 3D printing process. The 3D printing process may include any additive manufacturing process known in the art such as such as DMLD, MPBLS, and so on.

The second processing station 116 is adapted for receiving the substrate 104 along with the partially or completely 3D printed component 102, as the case may be, for machining the component 102 manufactured at the first processing station 114. The second processing station 116 includes a second enclosure 122 associated therewith. The second enclosure 122 is adapted to enclose the second processing station 116 therein. Also, the second enclosure 122 may enclose one or more equipment associated with the machining process. The machining process may include any subtractive manufacturing process known in the art such as cutting, turning, milling, grinding, polishing, ablation, and so on.

The third processing station 118 is adapted for receiving the substrate 104 along with the partially or completely 3D printed component 102, as the case may be, for cleaning the component 102 machined at the second processing station 116 and/or manufactured at the first processing station 114. The third processing station 118 includes a third enclosure 124 associated therewith. The third enclosure 124 is adapted to enclose the third processing station 118 therein. Also, the third enclosure 124 may enclose one or more equipment associated with the cleaning process. The cleaning process may include any cleaning process known in the art such as spraying, dipping, and so on.

Additionally or optionally, the system 100 may also include a first buffer zone 126 interconnected between the first processing station 114 and the second processing station 116. The first buffer zone 126 is adapted to isolate the first processing station 114 and the second processing station 116 from atmosphere and/or one another. More specifically, the first buffer zone 126 may isolate an environment within the first processing station 114 and the second processing station 116 respectively from the atmosphere and/or one another.

For example, the first processing station 114 may require an inert environment of an inert gas for the 3D printing process. The second processing station 116 may require a machining fluid handling environment for the machining process. Accordingly, the first buffer zone 126 may limit exfiltration of the inert gas from the first enclosure 120 to the atmosphere and/or the second enclosure 122. Similarly, the first buffer zone 126 may limit exfiltration of the machining fluid from the second enclosure 122 to the atmosphere and/or the first enclosure 120.

The system 100 may also include a second buffer zone 128 interconnected between the second processing station 116 and the third processing station 118. The second buffer zone 128 is adapted to isolate the second processing station 116 and the third processing station 118 from atmosphere and/or one another. More specifically, the second buffer zone 128 may isolate an environment within the second processing station 116 and the third processing station 118 respectively from the atmosphere and/or one another. For example, the third processing station 118 may require a clean environment for the cleaning process. Accordingly, the second buffer zone 128 may limit infiltration of the machining fluid and/or dust from the second enclosure 122 and/or the atmosphere respectively in to the third enclosure 124.

It should be noted that the system 100 may include additional processing stations other than the ones described herein. For example, the system 100 may include additional processing stations such as for one or more heat treatment processes, machining processes, cleaning processes, metrology, and so on based on application requirements. Also, a sequence of operation described herein is merely exemplary and may vary based on application requirements.

The first processing station 114 includes a second geometrical feature provided thereon. The second geometrical feature is adapted to interlock with the first geometrical feature of the substrate 104. In the illustrated embodiment, the second geometrical feature is a first slot 130 provided within the first processing station 114. The first slot 130 includes an inverted T-shaped configuration.

More specifically, the configuration of the first slot 130 is similar to the configuration of the first protrusion 112 of the substrate 104. In other embodiments, the first slot 130 may include any other configuration such as an L-shaped configuration, a stepped configuration, a toothed configuration, and so on similar to the configuration of the first protrusion 112 of the substrate 104. The first slot 130 is adapted to receive the first protrusion 112. Accordingly, the first protrusion 112 interlocks with the first slot 130 and removably affixes the substrate 104 to the first processing station 114.

Figure 2:
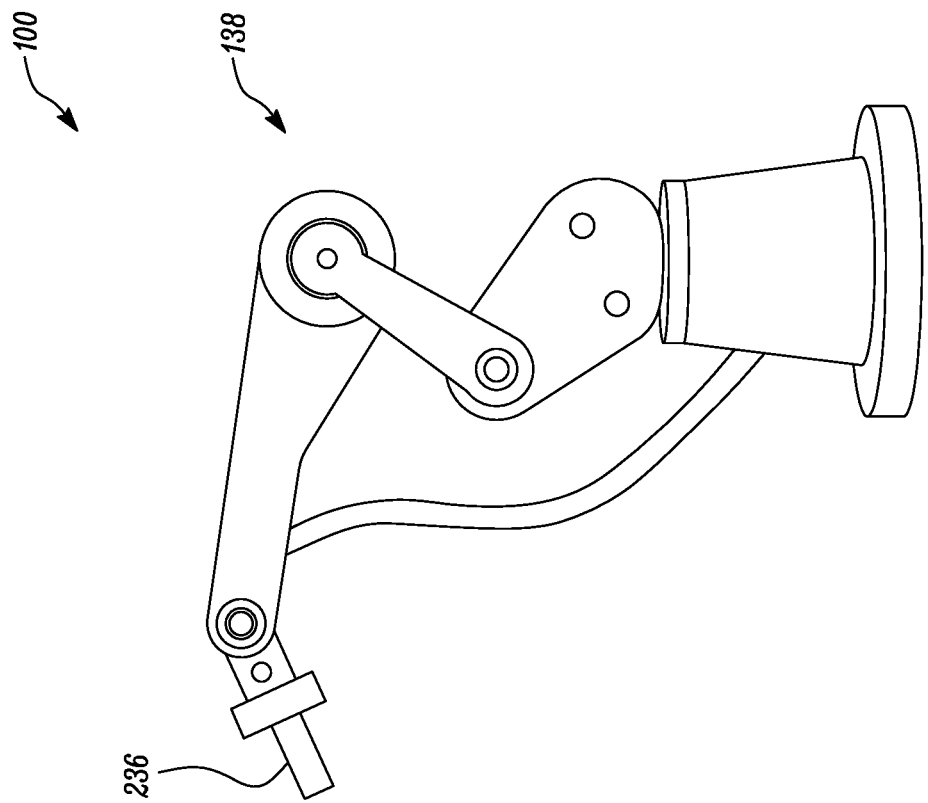
FIG. 2 is a partial schematic representation of another configuration of the system of FIG. 1, according to another embodiment of the present disclosure.
Figure 2:
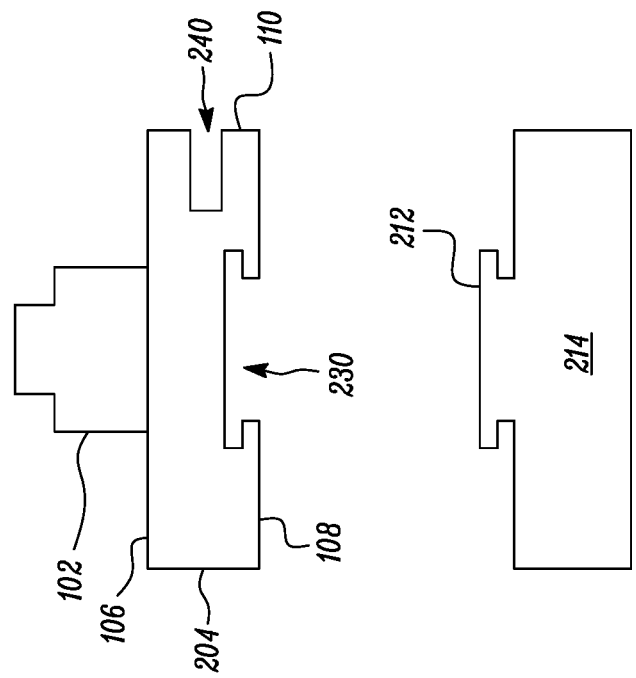

Alternatively, the first geometrical feature and the second geometrical feature described with reference to FIG. 1 may be interchanged. For example, in some embodiments, as shown in FIG. 2, the substrate 204 may include the first geometrical feature as a first slot 230. Accordingly, the first processing station 214 may include the second geometrical feature as a first protrusion 212. The first slot 230 may receive the first protrusion 212 in order to removably affix the substrate 204 on the first processing station 214. In the illustrated embodiment, the first slot 230 and the first protrusion 212 includes a T-shaped configuration. In other embodiments, the first slot 230 and the first protrusion 212 may include any other configuration such as a T-shaped configuration, a stepped configuration, a toothed configuration, and so on.

Referring to FIG. 1, it should be noted that a configuration of the second processing station 116, the third processing station 118, and so on is similar to the first processing station 114. More specifically, the second processing station 116 and the third processing station 118 include first slots 132, 134 respectively similar in configuration to the first slot 130 of the first processing station 114. The first slots 132, 134 are configured to receive the first protrusion 112 of the substrate 104 along with the component 102 for the machining process and the cleaning process respectively.

Further, the substrate 104 includes a third geometrical feature provided on the third surface 110. In other embodiments, the third geometrical feature may be provided on the first surface 106 or the second surface 108 based on application requirements. In the illustrated embodiment, the third geometrical feature is a second protrusion 136. The second protrusion 136 has a bar like configuration. In other embodiments, the second protrusion 136 may have any other configuration such as a T-shaped configuration, an L-shaped configuration, a stepped configuration, a toothed configuration, and so on.

Additionally, the system 100 includes a handling unit 138. The handling unit 138 is adapted to transfer the substrate 104 between the first, second, and third processing stations 114, 116, 118, and so on. In the illustrated embodiment, the handling unit 138 is a robotic arm. In other embodiments, the handling unit 138 may include any other handling unit such as a conveyor system, a crane, and so on.

The handling unit 138 includes a fourth geometrical feature provided thereon. The fourth geometrical feature is adapted to interlock with the third geometrical feature of the substrate 104. In the illustrated embodiment, the fourth geometrical feature includes a second slot 140 adapted to interlock with the second protrusion 136 of the substrate 104. During transfer of the substrate 104 between different processing stations, the second protrusion 136 of the substrate 104 is interlocked with the second slot 140 of the handling unit 138 in order to disconnect the substrate 104 from one processing station and further transfer the substrate 104 with/without the component 102 to another processing station based on application requirements.

Alternatively, the third geometrical feature and the fourth geometrical feature described with reference to FIG. 1 may be interchanged. For example, in some embodiments, as shown in FIG. 2, the substrate 204 may include the third geometrical feature as a second slot 240. Accordingly, the handling unit 138 may include the fourth geometrical feature as a second protrusion 236. The second slot 240 may receive the second protrusion 236 in order to removably affix the substrate 204 to the handling unit 138. In the illustrated embodiment, the second slot 240 and the second protrusion 236 includes a bar shaped configuration. In other embodiments, the second slot 240 and the second protrusion 236 may include any other configuration such as a T-shaped configuration, an L-shaped configuration, a stepped configuration, a toothed configuration, and so on.

INDUSTRIAL APPLICABILITY

Figure 3:
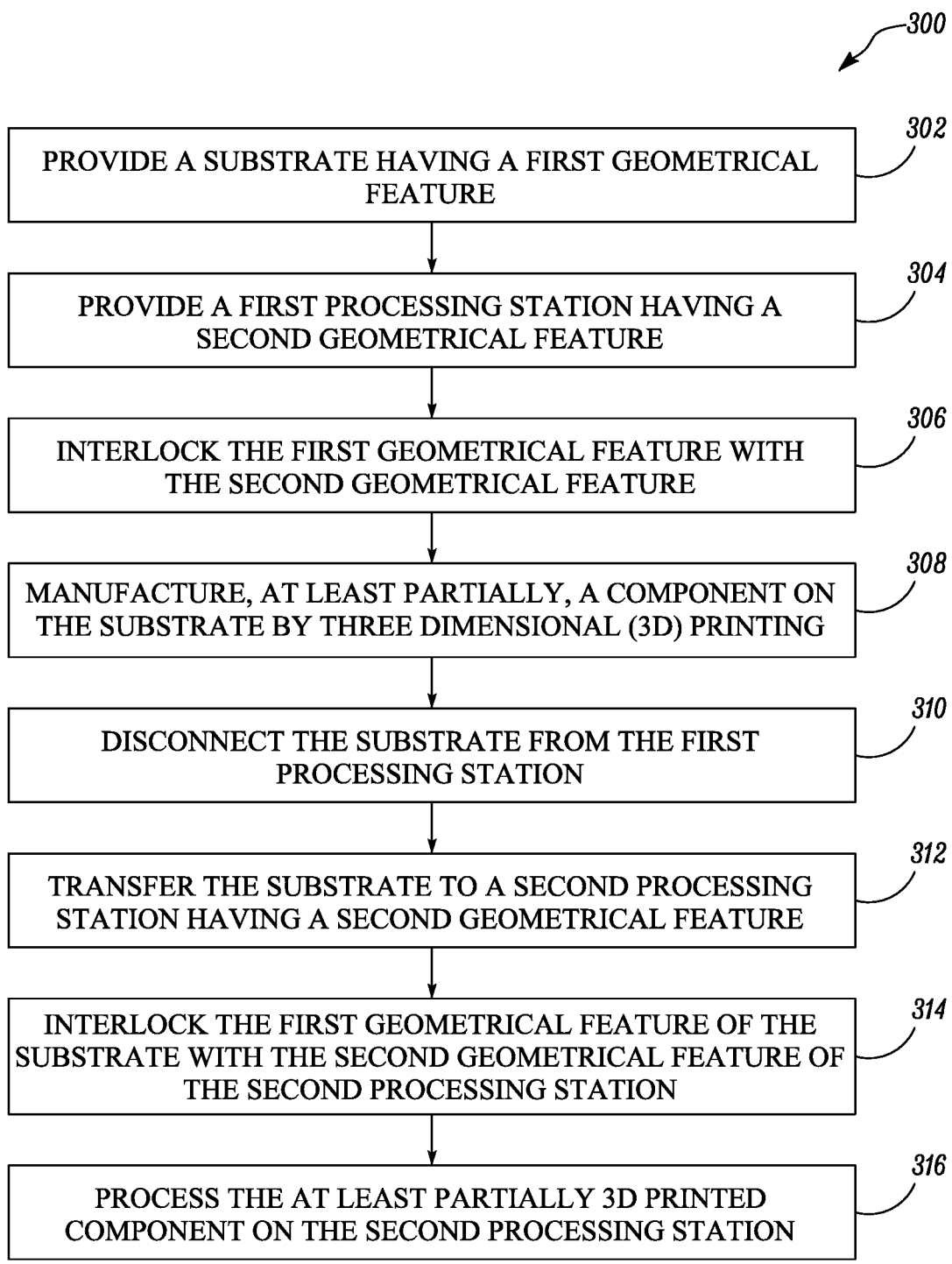
FIG. 3 is a flowchart of a method for manufacturing the component, according to one embodiment of the present disclosure.

The present disclosure relates to a method for manufacturing the component 102 using additive manufacturing such as 3D printing. Referring to FIG. 3, a method 300 for manufacturing the component 102 using the system 100 is illustrated. At step 302, the substrate 104 having the first geometrical feature is provided. In one embodiment, as shown in FIG. 1, the first geometrical feature is the first protrusion 112. At step 304, the first processing station 114 having the second geometrical feature is provided. In one embodiment, as shown in FIG. 1, the second geometrical feature is the first slot 130.

At step 306, the first geometrical feature is interlocked with the second geometrical feature. More specifically, the first protrusion 112 of the substrate 104 is received within and interlocked with the first slot 130 of the first processing station 114. As a result, the substrate 104 is removably affixed to the first processing station 114. At step 308, the component 102 is at least partially manufactured on the substrate 104 using any known additive manufacturing process such as 3D printing. In some embodiments, multiple components (not shown) may be manufactured simultaneously by 3D printing on the substrate 104 at the first processing station 114.

More specifically, in some embodiments, at step 308, the component 102 may be completely manufactured on the substrate 104 at the first processing station 114. In other embodiments, at step 308, the component 102 may be partially manufactured on the substrate 104 at the first processing station 114. In such a situation, the partially manufactured component 102 may be shuttled back to the first processing station 114 for further partial or complete manufacturing thereof, based on application requirements, after being processed at the second processing station 116 and/or the third processing station 118.

After the component 102 is partially or completely manufactured, at step 310, the substrate 104 is disconnected from the first processing station 114. More specifically, the third geometrical feature is provided on the substrate 104. In one embodiment, as shown in FIG. 1, the third geometrical feature is the second protrusion 136. Also, the fourth geometrical feature is provided on the handling unit 138. In one embodiment, as shown in FIG. 1, the fourth geometrical feature is the second slot 140.

Further, the third geometrical feature is interlocked with the fourth geometrical feature. More specifically, the second protrusion 136 is received within and removably affixed with the second slot 140. The substrate 104 is then disconnected from the first processing station 114 using the handling unit 138. At step 312, the substrate 104 along with the partially or completely manufactured component 102 is transferred to the second processing station 116 from the first processing station 114. More specifically, the substrate 104 is transferred using the handling unit 138 to the second processing station 116 having the second geometrical feature such as the first slot 132.

At step 314, the first geometrical feature of the substrate 104 is interlocked with the second geometrical feature of the second processing station 116. More specifically, the first protrusion 112 of the substrate 104 is received within and interlocked with the first slot 132 of the second processing station 116. As a result, the substrate 104 is removably affixed to the second processing station 116. At step 316, the partially or completely manufactured component 102 is processed on the second processing station 116.

Further, the substrate 104 is disconnected from the second processing station 116 and transferred to the third processing station 118 having the second geometrical feature such as the first slot 134. The substrate 104 is disconnected and transferred by the handling unit 138 in a manner similar to the one described in relation to step 310 and step 312. The first geometrical feature of the substrate 104 is interlocked with the second geometrical feature of the third processing station 118.

More specifically, the first protrusion 112 of the substrate 104 is received within and interlocked with the first slot 134 of the third processing station 118. As a result, the substrate 104 is removably affixed to the third processing station 118. Further, the component 102 is processed on the third processing station 118. The processing of the component 102 at the second processing station 116 and the third processing station 118 may include the machining process, the cleaning process, the heat treatment process, and/or the metrology, and so on based on application requirements. Further, as the component 102 is completely processed, the substrate 104 may be separated from the component 102 using any known process such as laser ablation, Electrical Discharge Machining (EDM), and so on.

In some embodiments, when the component 102 may be partially manufactured at the first processing station 114, the substrate 104 is disconnected from any one of the second processing station 116 and the third processing station 118, based on the sequence of operation. The substrate 104 along with the partially manufactured and processed component 102 is transferred back to the first processing station 114 having the second geometrical feature such as the first slot 130. The substrate 104 is disconnected and transferred by the handling unit 138 in a manner similar to the one described in relation to step 310 and step 312. The first geometrical feature of the substrate 104 is interlocked with the second geometrical feature of the first processing station 114 in a manner similar to the one described in relation to step 306.

More specifically, the first protrusion 112 of the substrate 104 is received within and interlocked with the first slot 130 of the first processing station 114. As a result, the substrate 104 is removably affixed to the first processing station 114. The component 102 is further manufactured, partially or completely based on application requirements, by 3D printing on the first processing station 114.

After the component 102 is partially or completely manufactured at first processing station 114, the substrate 104 is disconnected from the first processing station 114 and transferred to any one of the second processing station 116 and the third processing station 118 based on application requirements. More specifically, the substrate 104 is disconnected and transferred by the handling unit 138 in a manner similar to the one described in relation to step 310 and step 312.

Further, the first geometrical feature of the substrate 104 is interlocked with the second geometrical feature of the second processing station 116 or the third processing station 118 respectively, as the case may be. More specifically, the first protrusion 112 of the substrate 104 is received within and interlocked with the first slot 132 of the second processing station 116 or the first slot 134 of the third processing station 118. As a result, the substrate 104 is removably affixed to the second processing station 116 or the third processing station 118 respectively. The partially or completely manufactured component 102 is further processed on the second processing station 116 or the third processing station 118 respectively, and so on.

It should be noted that the component 102 may be transferred between the first, second, and third processing stations 114, 116, 118 multiple times for sequential manufacturing/processing of the component 102 based on the sequence of operations without limiting the scope of the disclosure. Furthermore, when the substrate 104 may be affixed at the first processing station 114, the second and third processing stations 116, 118 may be utilized for processing another manufactured component (not shown) and vice versa. More specifically, when the component 104 may be under manufacturing or processing at a particular processing station, other vacant processing stations may be utilized for manufacturing/processing of another component (not shown). As a result, the system 100 may be used for manufacturing/processing multiple components at different processing stations simultaneously in turn improving utilization and efficiency of the system 100.

The system 100 and the method 300 provides the substrate 104 having the first geometrical feature, and one or more processing stations having the second geometrical feature adapted to interlock with the first geometrical feature. As a result, the substrate 104 may be removably affixed to any of the processing stations without requiring dedicated fixturing tools at every processing station.

Also, the substrate 104 and the processing stations may be commonly used for components 102 having different geometries in turn reducing tooling cost, manufacturing cost, and so on, of the additive manufacturing process. As such, the system 100 and the method 300 provides to standardize a fixturing geometry between the substrate 104 and the one or more processing stations in order to easily transfer and fix the substrate 104 to different processing stations without requiring specialized fixturing solutions based on the geometry of the component 102.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A system for manufacturing a Three Dimensional (3D) printed component, the system comprising:
   a substrate adapted for at least partially 3D printing the 3D printed component thereon,
   the substrate including a first geometrical feature; and
   a plurality of processing stations interconnected to one another,
   each of the plurality of processing stations being adapted to receive the substrate,
   each of the plurality of processing stations including a second geometrical feature adapted to interlock with the first geometrical feature,
   the substrate further including a third geometrical feature that is adapted to interlock with a fourth geometrical feature of a handling unit, and
   the third geometrical feature being different from the first geometrical feature.

2. The system of claim 1, further including:
   the handling unit,
   the handling unit being adapted to transfer the substrate between each of the plurality of processing stations.

3. The system of claim 2, wherein the handling unit is at least one of a robotic arm, a conveyor system, or a crane.

4. The system of claim 1, wherein the first geometrical feature includes a first protrusion.

5. The system of claim 4, wherein the second geometrical feature includes a first slot adapted to receive the first protrusion.

6. The system of claim 1, wherein the first geometrical feature includes a first slot.

7. The system of claim 6, wherein the second geometrical feature includes a first protrusion adapted to be received within the first slot.

8. The system of claim 1, wherein the third geometrical feature includes a second protrusion.

9. The system of claim 8, wherein the fourth geometrical feature includes a second slot adapted to receive the second protrusion.

10. The system of claim 1, wherein the third geometrical feature includes a second slot.

11. The system of claim 10, wherein the fourth geometrical feature includes a second protrusion adapted to be received within the second slot.

12. A system for manufacturing a Three Dimensional (3D) printed component, the system comprising:
a substrate having a first surface and a second surface disposed opposing and spaced apart from the first surface,
the first surface adapted for at least partially 3D printing the 3D printed component thereon, and
the second surface including a first protrusion; and
a plurality of processing stations interconnected to one another, each of the plurality of processing stations adapted to receive the substrate,
each of the plurality of processing stations including a first slot adapted to interlock with the first protrusion,
the substrate further including a first geometric feature that is adapted to interlock with a second geometric feature of a handling unit, and
the first geometric feature being different from the first protrusion.

13. The system of claim 12, wherein the first geometric feature is a second protrusion provided on at least one of the first surface, the second surface, or a third surface that is disposed in association with the first surface and the second surface.

14. The system of claim 13, further including:
the handling unit,
the handling unit being adapted to transfer the substrate between each of the plurality of processing stations, and
the second geometric feature being a second slot adapted to interlock with the second protrusion.

15. The system of claim 14, wherein the handling unit is at least one of a robotic arm, a conveyor system, or a crane.

16. A method comprising:
interlocking a first geometrical feature, of a substrate, with a second geometrical feature of a first processing station;
manufacturing, after interlocking the first geometrical feature with the second geometrical feature of the first processing station, an at least partially three-dimensional (3D) printed component on the substrate by 3D printing;
interlocking a third geometrical feature, of the substrate, with a fourth geometrical feature of a handling unit,
the third geometrical feature being different from the first geometrical feature;
transferring, after interlocking the third geometrical feature with the fourth geometrical feature, the substrate to a second processing station having a second geometrical feature;
interlocking the first geometrical feature of the substrate with the second geometrical feature of the second processing station; and
processing the at least partially 3D printed component on the second processing station after interlocking the first geometrical feature with the second geometrical feature of the second processing station.

17. The method of claim 16, further including:
disconnecting the substrate from the second processing station;
transferring the substrate to a third processing station having a second geometrical feature;
interlocking the first geometrical feature of the substrate with the second geometrical feature of the third processing station; and
processing the at least partially 3D printed component on the third processing station.

18. The method of claim 16, further including:
disconnecting the substrate from the second processing station or a third processing station;
transferring the substrate to the first processing station after disconnecting the substrate from the second processing station or the second processing station; and
interlocking, after transferring the substrate to the first processing station, the first geometrical feature of the substrate with the second geometrical feature of the first processing station.

19. The method of claim 16, wherein transferring the substrate includes:
transferring the substrate from the first processing station to the second processing station with the handling unit.

20. The system of claim 1, wherein the plurality of processing stations include:
a first processing station that includes equipment associated with an additive manufacturing process, and
a second processing station that includes equipment associated with a subtractive manufacturing process.

* * * * *